(12) United States Patent
Sandage (10) Patent No.: US 10,346,644 B2
(45) Date of Patent: Jul. 9, 2019

(54) METHOD AND APPARATUS FOR LOCATION-BASED RECOVERY OF STOLEN MOBILE DEVICES

(71) Applicant: Intel Corporation, Santa Clara, CA (US)

(72) Inventor: David A. Sandage, Forest Grove, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/046,754

(22) Filed: Jul. 26, 2018

(65) Prior Publication Data

US 2019/0108369 A1 Apr. 11, 2019

Related U.S. Application Data (63) Continuation of application No. 15/298,081, filed on Oct. 19, 2016, now Pat. No. 10,061,945, which is a continuation of application No. 11/014,891, filed on Dec. 17, 2004, now Pat. No. 9,501,669.

(51) Int. Cl.
  *G08B 1/08* (2006.01)
  *G06F 21/88* (2013.01)

(52) U.S. Cl.
  CPC .................... *G06F 21/88* (2013.01)

(58) Field of Classification Search
  None
  See application file for complete search history.

(56) References Cited

U.S. PATENT DOCUMENTS

| | | | |
|---|---|---|---|
| 6,300,863 B1 * | 10/2001 | Cotichini | G06F 11/006 |
| | | | 340/10.42 |
| 6,331,825 B1 | 12/2001 | Ladner et al. | |
| 7,096,354 B2 | 8/2006 | Wheeler et al. | |
| 8,855,667 B2 | 10/2014 | Lada et al. | |
| 9,501,669 B2 | 11/2016 | Sandage | |
| 10,061,945 B2 | 8/2018 | Sandage | |
| 2002/0057283 A1 | 5/2002 | Biswas et al. | |
| 2002/0095486 A1 | 7/2002 | Bahl | |
| 2003/0005316 A1 | 1/2003 | Girard | |

(Continued)

OTHER PUBLICATIONS

United States Patent and Trademark Office, "Non-final Office Action," issued in connection with U.S. Appl. No. 11/014,891 dated Sep. 8, 2006, 12 pages.

(Continued)

*Primary Examiner* — Julie B Lieu
(74) *Attorney, Agent, or Firm* — Hanley, Flight & Zimmerman, LLC.

(57) ABSTRACT

A method, apparatus, and system for locating mobile devices. The system includes a location-aware mobile device. The location-aware mobile device includes a location-aware mechanism embedded in a platform firmware layer of the location-aware mobile device. The system also includes a central database to receive location information from the location-aware mobile device over a network. If the location-aware mobile device has been stolen, lost, or misplaced, the central database reports the stolen, lost, or misplaced location-aware mobile device and its location to appropriate persons to enable the location-aware mobile device to be recovered.

24 Claims, 4 Drawing Sheets

(56) References Cited

U.S. PATENT DOCUMENTS

| | | | |
|---|---|---|---|
| 2005/0020210 A1* | 1/2005 | Krumm | G01C 21/00 |
| | | | 455/41.2 |
| 2005/0149752 A1* | 7/2005 | Johnson | G06F 21/88 |
| | | | 726/4 |
| 2005/0184857 A1* | 8/2005 | Roatis | G06F 21/6209 |
| | | | 340/5.73 |
| 2008/0007406 A1 | 1/2008 | Velhal et al. | |
| 2011/0072520 A1 | 3/2011 | Bhansali et al. | |
| 2013/0045759 A1* | 2/2013 | Smith | H04W 4/029 |
| | | | 455/456.6 |
| 2013/0122932 A1* | 5/2013 | Patel | H04W 4/02 |
| | | | 455/456.2 |
| 2014/0161245 A1* | 6/2014 | Zises | H04M 3/54 |
| | | | 379/211.02 |
| 2015/0046980 A1* | 2/2015 | Gordon | G06F 21/88 |
| | | | 726/3 |
| 2017/0287085 A1* | 10/2017 | Smith | G01S 5/0027 |
| 2018/0020329 A1* | 1/2018 | Smith | H04W 4/029 |
| 2019/0051082 A1* | 2/2019 | Denison | G07F 11/002 |

OTHER PUBLICATIONS

United States Patent and Trademark Office, "Non-final Office Action," issued in connection with U.S. Appl. No. 11/014,891 dated Oct. 29, 2015, 11 pages.

United States Patent and Trademark Office, "Final Office Action," issued in connection with U.S. Appl. No. 11/014,891 dated May 10, 2016, 13 pages.

United States Patent and Trademark Office, "Notice of Allowance and Fee(s) Due," issued in connection with U.S. Appl. No. 11/014,891 dated Jul. 27, 2016, 5 pages.

United States Patent and Trademark Office, "Non-final Office Action," issued in connection with U.S. Appl. No. 15/298,081 dated Oct. 19, 2017, 5 pages.

United States Patent and Trademark Office, "Notice of Allowance and Fee(s) Due," issued in connection with U.S. Appl. No. 15/298,081 dated May 9, 2018, 5 pages.

* cited by examiner

METHOD AND APPARATUS FOR LOCATION-BASED RECOVERY OF STOLEN MOBILE DEVICES

RELATED APPLICATION

This application is a Continuation of U.S. patent application Ser. No. 15/298,081, entitled "METHOD AND APPARATUS FOR LOCATION-BASED RECOVERY OF STOLEN MOBILE DEVICES", filed Oct. 19, 2016, which is a Continuation of U.S. patent application Ser. No. 11/014,891, entitled METHOD AND APPARATUS FOR LOCATION-BASED RECOVERY OF STOLEN MOBILE DEVICES," filed Dec. 17, 2004, now U.S. Pat. No. 9,501,669, issued Nov. 22, 2016. The Specifications of application Ser. Nos. 15/298,081 and 11/014,891 are hereby fully incorporated by reference.

BACKGROUND OF THE INVENTION

Field of the Invention

Embodiments of the present invention are generally related to the field of location aware computing. More particularly, embodiments of the present invention are related to a method and apparatus for location-based recovery of lost or stolen mobile devices.

DESCRIPTION

Location awareness is becoming increasingly important in computing systems, especially in mobile devices. Location awareness in mobile devices enables users to be directed to specific locations, to find people and resources, and to switch the operating context of the mobile device based on location (e.g., home vs. work). Currently, location awareness is implemented at the operating system or application level.

With the location awareness being implemented at the operating system or application level, if the mobile device is stolen, the thief may replace the encrypted hard drive, thereby causing the location awareness capability to be lost as well.

Thus, what is needed is a method and apparatus for enabling a mobile device to have location awareness capabilities that cannot be removed with the removal of the hard drive. What is also needed is a method and apparatus for enabling a mobile device to be located when stolen, lost, misplaced, etc., using location awareness capabilities built into the mobile device.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearance of the phrases "in one embodiment" and "in an embodiment" appearing in various places throughout the specification are not necessarily all referring to the same embodiment.

Embodiments of the present invention are directed to a method and apparatus for location-based recovery of stolen, lost, or misplaced mobile devices. This is accomplished by embedding location-aware technology within the platform firmware of the mobile device. The embedded location-aware capabilities may be used to provide the location of the mobile device, and, if necessary, to enable the recovery of the mobile device if it is stolen, lost, or misplaced. Implementing the location-aware technology in the firmware rather than the operating system or application layer prevents the location-based recovery mechanism from being removed if the disk drive is replaced. The location-aware capabilities in the mobile device include a location sensing technology built into the platform firmware by the factory as part of the motherboard and a location reporting module as part of the platform firmware for reporting the location of the mobile device to an Internet node. The location of the mobile device is reported to a central database to enable the mobile device to be recovered if it was stolen, lost, or misplaced or for other purposes, such as, for example, keeping track of inventory.

Embodiments of the present invention may require the firmware and any firmware upgrades to be non-hackable. Therefore, the firmware and any firmware upgrades are signed to prevent the replacement of the firmware with alternate firmware that does not contain the location-based recovery mechanism. Digitally signing the firmware and any firmware upgrades prevents the firmware from being replaced with something that is not digitally signed. This also proves whether a replacement is valid. Digital signatures are well-known in the relevant art(s).

Embodiments of the present invention are shown as being implemented in the platform firmware of a laptop computer. Although the location-aware capabilities are described as being implemented in the platform firmware of a laptop computer, the invention is not limited to laptop computers. The location-aware capabilities may be implemented in the platform firmware of other mobile computing devices, such as, for example, personal digital assistants, notebook computers, tablet computers, cellular telephones, pagers, etc. In fact, embodiments of the invention may also be used to locate computing devices that may not be classified as mobile, yet may be compact enough to be easily stolen, lost, or misplaced.

Figure 1:
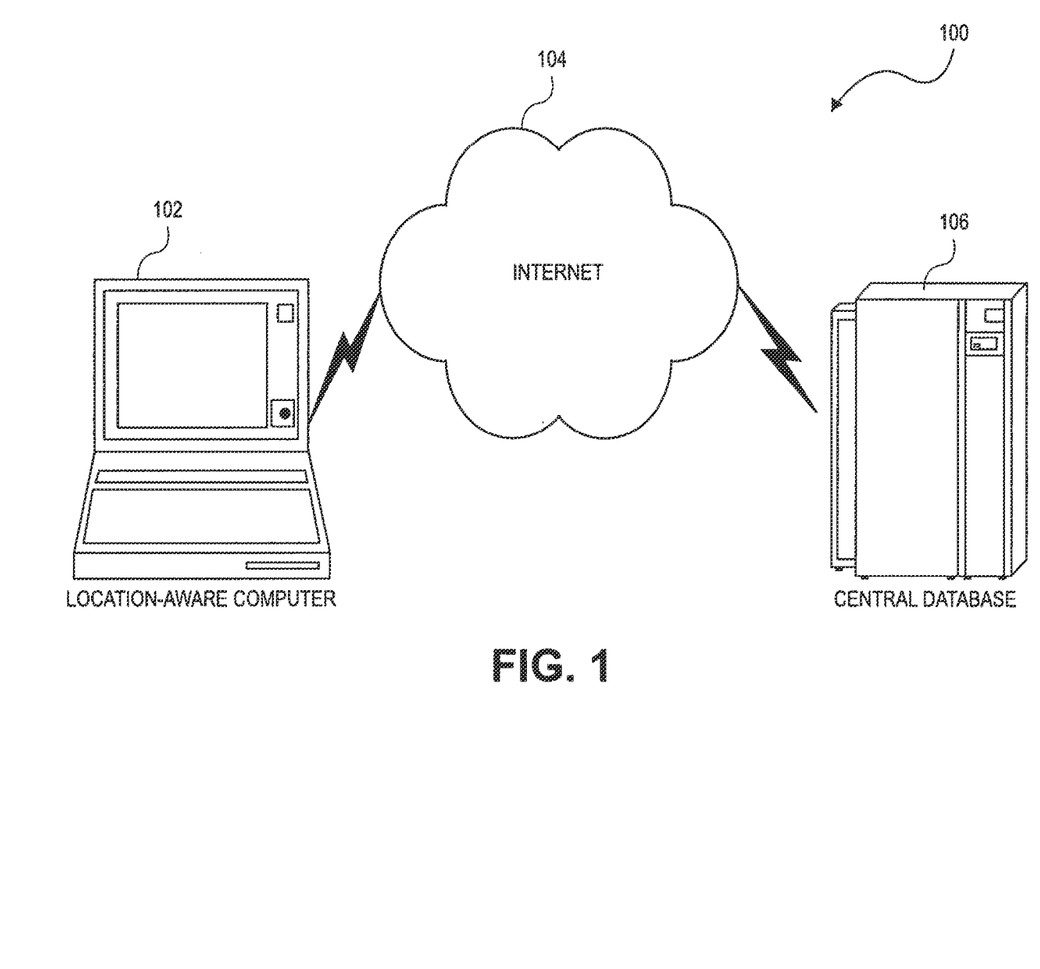
FIG. 1 is a block diagram illustrating an exemplary system for location-based recovery of mobile devices according to an embodiment of the present invention.

FIG. 1 is a block diagram illustrating an exemplary system 100 for location-based recovery of mobile devices according to an embodiment of the present invention. System 100 comprises a location-aware computing device such as, for example, laptop 102, a wide-area network such as, for example, Internet 104, and a central database 106. Internet 104 allows location-aware computing device 102 to communicate with central database 106, and vice versa.

Although location-aware computing device 102 is shown as a laptop computer, location-aware computing device 102 may be any mobile device capable of location-aware computing. Such mobile devices may include, but are not limited to, laptop computers, notebook computers, tablet computers, personal digital assistants (PDAs), cellular telephones, pagers, etc. Location-aware computing device 102 may also be referred to as a mobile device.

Location-aware computing device 102 includes location hardware implemented within the platform's firmware. Location-aware computing device 102 may be capable of connecting to Internet 104 via a wireless and/or wired connection. Location-aware computing device 102 will be described further with reference to FIG. 2.

In one embodiment, central database 106 may be part of a corporate Information Technology (IT) department tasked to maintain, keep track of, and protect all mobile devices owned by the corporation. In another embodiment, central database 106 may be owned by a service provider company tasked to monitor or track personally owned mobile devices to enable the mobile devices to be recovered if they are stolen, lost, or misplaced. Other types of entities may also provide a central database for tracking location-aware computing devices.

Central database 106 receives location reports and mobile device identification information on a plurality of mobile devices. Central database 106 also reports the location of a stolen, lost, or misplaced mobile device to the appropriate parties. The appropriate parties may be, but are not limited to, the corporate IT department, the service provider, the owner of the mobile device, the rightful user of the mobile device, law enforcement officials, etc.

Figure 2:
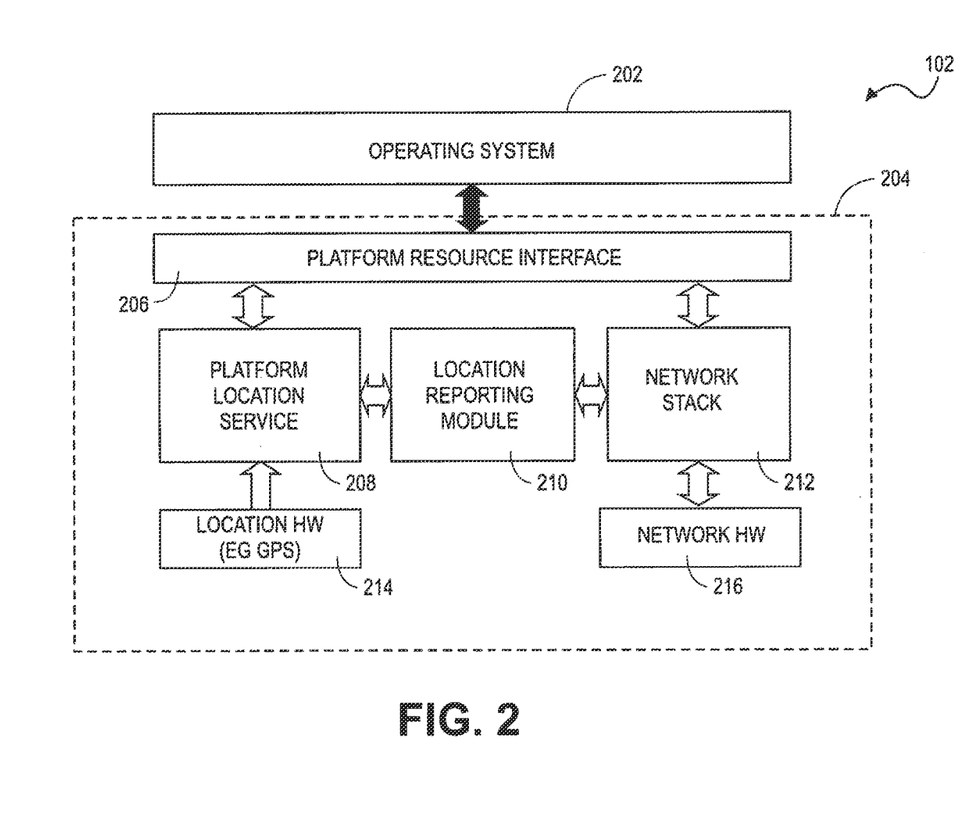
FIG. 2 is a block diagram illustrating an exemplary apparatus of a location-based recovery mechanism embedded in the platform firmware of a mobile device according to an embodiment of the present invention.

FIG. 2 is a block diagram 200 illustrating an exemplary apparatus for a location-based recovery mechanism embedded in platform firmware of a mobile device according to an embodiment of the present invention. Shown in FIG. 2 is an operating system 202 coupled to a platform firmware layer 204. Operating system 202 is a program in the mobile device that is loaded off of a hard drive, flash memory, or some other type of non-volatile memory and resides in temporary memory. Operating system 202 maintains disk files, runs applications, and handles devices, such as, for example, a keyboard, a monitor, a printer, a mouse, a disk drive, etc. Operating systems are well known in the relevant art(s). In embodiments of the present invention, the location-based recovery mechanism is separate from operating system 202, and is embedded in platform firmware layer 204.

Platform firmware layer 204 comprises, inter alia, a platform resource interface 206, a platform location service 208, a location reporting module 210, a network stack 212, network hardware 216, and location hardware 214. Platform resource interface 206 may be coupled to platform location service 208 and network stack 212. Platform location service 208 may be coupled to location hardware 214 and location reporting module 210. Network stack 212 may be coupled to location reporting module 210 and network hardware 216.

Platform resource interface 206 is an interface layer that enables operating system 202 to communicate with the remaining components in platform firmware layer 204. In one embodiment of the invention, platform resource interface 206 may be a set of application programming interfaces (APIs) that enable operating system 202 to communicate with the other components in platform firmware layer 204. For example, operating system 202 may use platform resource interface 206 to send network packets back and forth over a network via network stack 212 and network hardware 216. Also, operating system 202 may use platform resource interface 206 to request the location of the mobile device via platform location service 208 and location hardware 214.

Platform location service 208 is a firmware module that provides location information to an entity requesting the location of the mobile device. Platform location service 208 provides the location information in the proper format for the requesting entity. For example, operating system 202 may request the location of the mobile device and platform location service 208 will provide the information to operating system 202 in a format suitable for operating system 202, such as, for example, in the form of longitude and latitude. Platform location service 208 may also receive a request for the location of the mobile device from location reporting module 210.

Platform location service 208 retrieves the location information from location hardware 214. Location hardware 214 may be any hardware capable of determining the location of the mobile device. For example, location hardware 214 may be a global positioning system (GPS) receiver, which is well known in the relevant art(s). Location hardware may also be a WI-FI (Wireless Fidelity) receiver for determining location based on WI-FI access points, a cellular receiver for determining location based on cell tower proximity, or any other receiver capable of determining the location of the mobile device.

Location reporting module 210 initiates the transaction that reports the location of the mobile device to the central database. Thus, location reporting module 210 handles all outside requests for the location of the mobile device. Location reporting module 210 keeps abreast of when platform firmware layer 204 connects to the Internet. Location reporting module 210 sends and receives network packets off of network stack 212. When platform firmware layer 204 connects to the Internet, location reporting module 210 is made aware of the connection from network stack 212. Location reporting module 210 sends an initial network packet to central database 106 to inquire whether central database 106 wants location information for the mobile device. The network packet includes an identifier to enable central database 106 to identify the mobile device that sent the network packet. If central database 106 responds that it does want location information for the mobile device, then location reporting module 210 will query platform location service 208 to obtain its location from location hardware 214. When location reporting module 210 receives the location information from platform location service 208, location reporting module 210 packages the information into a network packet and sends it back out of network stack 212 via network hardware 216 to central database 106.

Network stack 212, along with network hardware 216, are standard components that allow other components on platform firmware layer 204 to send and receive network packets over the Internet, and are well-known in the art(s). Network stack 212 puts network packets together and controls network hardware 216. Network stack 212 may be software, such as, for example, a TCP/IP stack. Network hardware 216 may be a network interface card (NIC), such as, for example, a WI-FI card, an Ethernet card, etc. Network hardware 216 may also be a phone modem or anything that allows platform firmware layer 204 to connect to the Internet.

Figure 3:
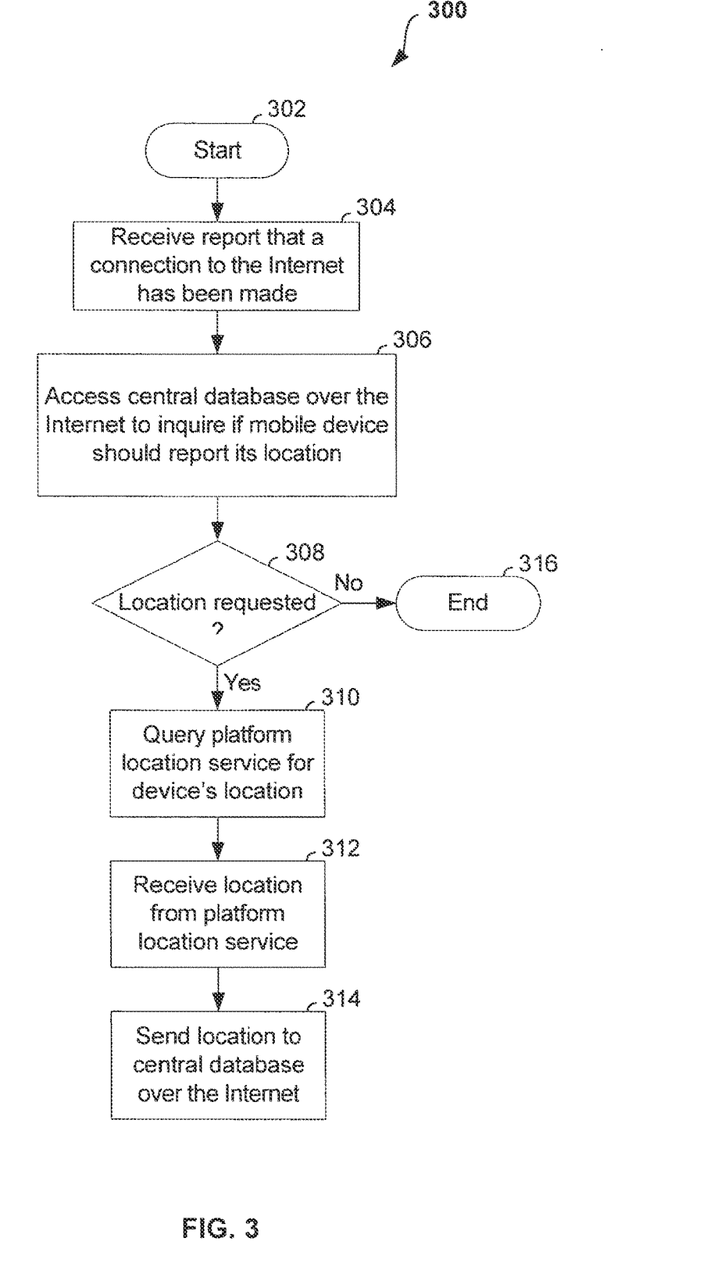
FIG. 3 is a flow diagram illustrating an exemplary method for location-based recovery of mobile devices that are stolen, lost, or misplaced from the perspective of a location reporting module according to an embodiment of the present invention.

FIG. 3 is a flow diagram 300 illustrating an exemplary method for location-based recovery of mobile devices that are stolen, lost, or misplaced from the perspective of a location reporting module according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins at 302, where the process immediately proceeds to block 304.

In block 304, network stack 212 reports that a connection to Internet 104 has been made. Central database 106 is then accessed to see if the mobile device should report its location to the central database (block 306). The process then proceeds to decision block 308.

In decision block 308, it is determined whether central database 106 has requested the location of the mobile device. If it is determined that central database 106 has requested the location of the mobile device, the process proceeds to block 310.

In block 310, platform location service 208 is queried to obtain the location of the mobile device. The location of the mobile device is obtained from location hardware 214. Location hardware 214 may use sensing technology to determine the location of the mobile device. The process then proceeds to block 312.

In block 312, the location of the mobile device is received. The location of the mobile device is then sent to central database 106 via network stack 212, network hardware 216, and Internet 104, thereby enabling central database 106 to notify the appropriate parties. If the mobile device has been lost, stolen, or misplaced, central database 106 will notify the appropriate parties who may take action to recover the mobile device. Such parties may include, but are not limited to, the corporate IT department, the service provider organization, the local law enforcement department, the owner of the mobile device, the person listed as being responsible for the mobile device, etc.

Returning to decision block 308, if it is determined that central database 106 has not requested the location of the mobile device, the process proceeds to block 314. In block 314, the process ends.

Figure 4:
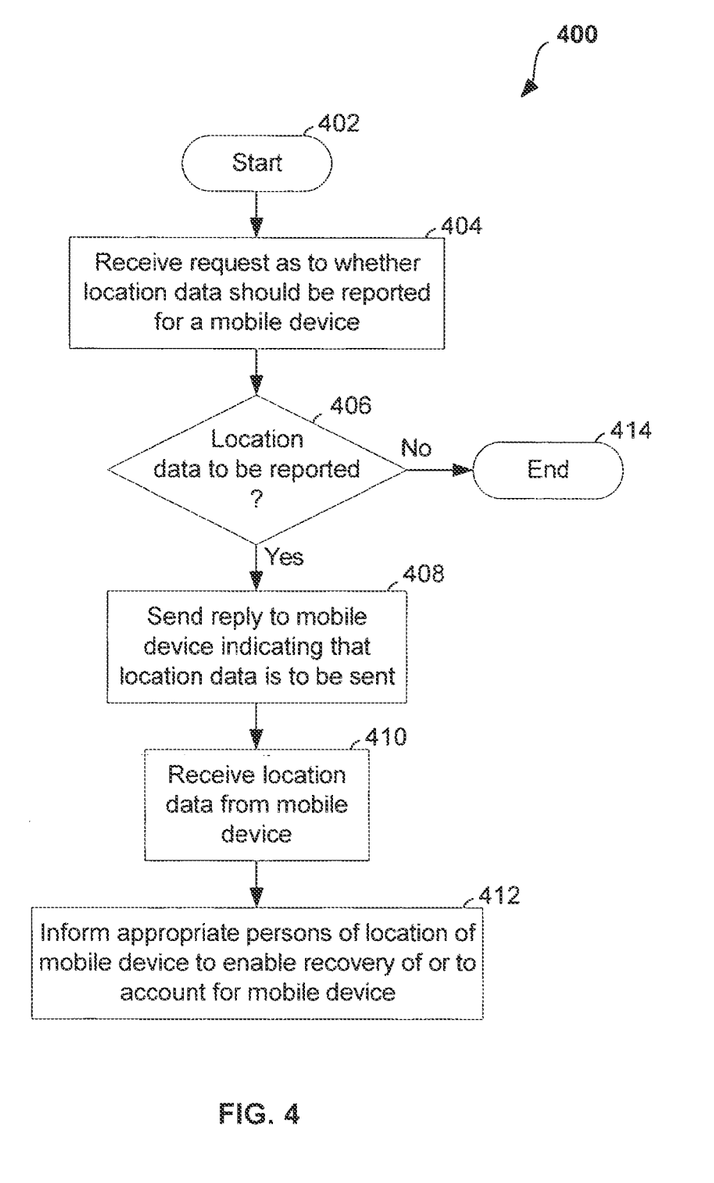
FIG. 4 is a flow diagram illustrating an exemplary method for location-based recovery of mobile devices that are stolen, lost, or misplaced from the perspective of a central database according to an embodiment of the present invention.

FIG. 4 is a flow diagram 400 illustrating an exemplary method for location-based recovery of mobile devices that are stolen, lost, or misplaced from the perspective of a central database according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at 402, where the process immediately proceeds to block 404.

In block 404, a request as to whether location data should be reported for a mobile device is received from the mobile device. The request includes identification for the mobile device. In one embodiment, the identification may be an address unique to the mobile device, such as, for example, a MAC (Media Access Control) address. Other types of unique identifiers may also be used. The process then proceeds to decision block 406.

In decision block 406, it is determined whether location data should be reported for the mobile device identified in the request. Central database 106 may determine, using the unique identifier provided in the network packet, whether the entity in control of central database 106 is interested in knowing the location of the mobile device. For example, if the mobile device has been reported stolen, lost, or misplaced, or if the entity in control of the central database needs to know the location of the mobile device for inventory purposes, then central database 106 will determine that the location is needed and the process will proceed to block 408.

In block 408, a reply is sent to the mobile device indicating that the location of the mobile device should be sent to central database 106. In block 410, the location data for the mobile device is received. The process then proceeds to block 412, where the appropriate persons are informed of the location of the mobile device for purposes of recovering the mobile device if the mobile device has been stolen, lost, or misplaced or, if the mobile device has not been lost, stolen, or misplaced, for purposes of keeping track of inventory or other purposes.

Returning to decision block 406, if it is determined that location data for the mobile device identified in the request should not be reported, then the process proceeds to block 414. In block 414, the process ends.

Although embodiments of the present invention are described with a mobile reporting its location only when requested by central database 106, the invention is not limited to this. For example, in an alternative embodiment, an administrator for central database 106 may set a policy to have a mobile device report its location each time the mobile device connects to the Internet. Other reporting policies may also be implemented by the administrator as well.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A mobile computing device comprising:
   a display;
   a network interface card;
   a storage drive;
   at least one of a Global Positioning System (GPS) receiver, a cellular receiver, or a Wi-Fi network adapter;
   at least one processor;
   a platform firmware layer including instructions that, when executed, cause the at least one processor to:
      transmit, using the network interface card, an identifier for the computing device to a remote server;
      determine a location of the computing device based on the at least one of the GPS receiver, the cellular receiver, or the Wi-Fi network adapter of the computing device, the location corresponding to a longitude and a latitude; and
      transmit, using the network interface card, the location corresponding to the computing device to the remote server to facilitate recovery of the computing device if stolen, lost, or misplaced, the platform firmware layer being separate from an operating system of the computing device to (i) remain able to determine and report the location of the computing device after replacement of the operating system of the computing device and (ii) remain able to determine and report the location of the computing device after replacement of the storage drive having the operating system of the computing device.

2. The mobile computing device of claim 1, wherein the processor is to transmit, using the network interface card, the location corresponding to the computing device in response to a request from the remote server.

3. The mobile computing device of claim 1, wherein the processor is to transmit, using the network interface card, the location corresponding to the computing device in response to a determination that the computing device is connected to a network.

4. The mobile computing device of claim 1, wherein the platform firmware layer is digitally signed.

5. The mobile computing device of claim 1, wherein the platform firmware layer includes the at least one of the GPS receiver, the cellular receiver, or the Wi-Fi network adapter.

6. The mobile computing device of claim 1, wherein the mobile computing device corresponds to one of a laptop computer, a notebook computer, a tablet computer, a personal digital assistant, a cellular telephone, or a pager.

7. A system comprising:
   a central database;
   a first mobile computing device to communicate with the central database via a network, the first mobile computing device having first firmware to cause the first mobile computing device to:
      transmit first identification information to the central database, the first identification information to identify the first mobile computing device;
      determine a first location of the first mobile computing device based on the at least one of a Global Positioning System (GPS) receiver, a cellular receiver, or a Wi-Fi network adapter of the first mobile computing device, the first location corresponding to a longitude and a latitude; and
      transmit the first location corresponding to the first mobile computing device to the central database to facilitate recovery of the first mobile computing device if stolen, lost, or misplaced, the first firmware being separate from a first operating system of the first mobile computing device to (i) remain able to determine and report the location of the first mobile computing device after replacement of the first operating system of the first mobile computing device and (ii) remain able to determine and report the location of the first mobile computing device after replacement of a first storage drive including the first operating system of the first mobile computing device; and
   a second mobile computing device to communicate with the central database via the network, the second mobile computing device having second firmware to cause the second mobile computing device to:
      transmit second identification information to the central database, the second identification information to identify the second mobile computing device;

determine a second location of the second mobile computing device based on the at least one of a GPS receiver, a cellular receiver, or a Wi-Fi network adapter of the second mobile computing device, the second location corresponding to a longitude and a latitude; and transmit the second location corresponding to the second mobile computing device to the central database to facilitate recovery of the second mobile computing device if stolen, lost, or misplaced, the second firmware being separate from a second operating system of the second mobile computing device to (i) remain able to determine and report the location of the second mobile computing device after replacement of the second operating system of the second mobile computing device and (ii) remain able to determine and report the location of the second mobile computing device after replacement of a second storage drive having the second operating system of the second mobile computing device.

8. The system of claim 7, wherein the central database is to send a request to at least one of the first mobile computing device or the second mobile computing device, the at least one of the first mobile computing device or the second mobile computing device to transmit the corresponding first or second location in response to the request.

9. The system of claim 7, wherein the first mobile computing device is to transmit the first location in response to a determination that the first mobile computing device is connected to the network.

10. The system of claim 7, wherein the first firmware is digitally signed.

11. The system of claim 7, wherein the at least one of the GPS receiver, the cellular receiver, or the Wi-Fi network adapter of the first mobile computing device is built into a platform firmware layer associated with the first firmware.

12. The system of claim 7, wherein the first mobile computing device corresponds to one of a laptop computer, a notebook computer, a tablet computer, a personal digital assistant, a cellular telephone, or a pager.

13. The system of claim 7, wherein the central database collects the first location of the first mobile computing device and the second location of the second mobile computing device to keep track of inventory.

14. The system of claim 7, wherein the central database is to report at least one of the first location of the first mobile computing device or the second location of the second mobile computing device to at least one of a corporate information technology department, a service provider, an owner of the first or second mobile computing devices, a user of the first mobile computing device, or a law enforcement official.

15. At least one computer readable storage medium comprising instructions implemented in firmware in a computing device, the instructions, when executed, to cause the computing device to at least:

provide an identifier for the computing device to a remote server; and determine a location of the computing device based on at least one of a Global Positioning System (GPS) receiver, a cellular receiver, or a Wi-Fi network adapter of the computing device, the location corresponding to a longitude and a latitude; and provide the location corresponding to the computing device to the remote server to facilitate recovery of the computing device if stolen, lost, or misplaced, the firmware separate from an operating system of the computing device to (i) remain able to determine and report the location of the computing device after replacement of the operating system of the computing device and (ii) remain able to determine and report the location of the computing device after replacement of a storage drive having the operating system of the computing device.

16. The at least one computer readable medium of claim 15, wherein the instructions cause the computing device to provide the location corresponding to the computing device in response to a request from the remote server.

17. The at least one computer readable medium of claim 15, wherein the instructions cause the computing device to provide the location corresponding to the computing device in response to a determination that the computing device is connected to a network.

18. The at least one computer readable medium of claim 15, wherein the firmware is digitally signed.

19. The at least one computer readable medium of claim 15, wherein the at least one of the GPS receiver, the cellular receiver, or the Wi-Fi network adapter of the computing device is built into a platform firmware layer associated with the firmware.

20. A mobile computing device comprising:

a display;

a network interface card to transmit an identifier for the mobile computing device to a remote server;

a storage drive;

at least one of a Global Positioning System (GPS) receiver, a cellular receiver, or a Wi-Fi network adapter;

at least one processor; and a firmware layer including means for determining a location of the mobile computing device based on the at least one of the GPS receiver, the cellular receiver, or the Wi-Fi network adapter of the mobile computing device, the location corresponding to a longitude and a latitude, the network interface card to transmit the location corresponding to the mobile computing device to the remote server to facilitate recovery of the mobile computing device if stolen, lost, or misplaced, the firmware layer separate from an operating system of the mobile computing device to enable the determining means to (i) remain able to determine the location of the mobile computing device after replacement of the operating system of the mobile computing device and (ii) remain able to determine the location of the mobile computing device after replacement of the storage drive having the operating system of the mobile computing device.

21. The mobile computing device of claim 20, wherein the network interface card is to transmit the location corresponding to the mobile computing device in response to a request from the remote server.

22. The mobile computing device of claim 20, wherein the network interface card is to transmit the location corresponding to the mobile computing device in response to a determination that the mobile computing device is connected to a network.

23. The mobile computing device of claim 20, wherein the firmware layer includes the at least one of the GPS receiver, the cellular receiver, or the Wi-Fi network adapter.

24. The mobile computing device of claim 20, wherein the mobile computing device corresponds to one of a laptop computer, a notebook computer, a tablet computer, a personal digital assistant, a cellular telephone, or a pager.

* * * * *